US012691720B2

(12) United States Patent
Michiura et al.

(10) Patent No.: US 12,691,720 B2
(45) Date of Patent: Jul. 28, 2026

(54) SHOCK ABSORBER

(71) Applicant: Hitachi Astemo, Ltd., Hitachinaka (JP)

(72) Inventors: Daisuke Michiura, Hitachinaka (JP); Masataka Fujita, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 19/113,297

(22) PCT Filed: Oct. 13, 2022

(86) PCT No.: PCT/JP2022/038282
§ 371 (c)(1),
(2) Date: Mar. 19, 2025

(87) PCT Pub. No.: WO2024/079862
PCT Pub. Date: Apr. 18, 2024

(65) Prior Publication Data
US 2026/0103041 A1 Apr. 16, 2026

(51) Int. Cl.
B60G 17/08 (2006.01)
B60G 13/08 (2006.01)
B60G 17/015 (2006.01)

(52) U.S. Cl.
CPC ............. B60G 17/08 (2013.01); B60G 13/08 (2013.01); B60G 17/0152 (2013.01); *B60G 2202/24* (2013.01); *B60G 2500/302* (2013.01)

(58) Field of Classification Search
None
See application file for complete search history.

(56) References Cited

U.S. PATENT DOCUMENTS

| | | | | |
|---|---|---|---|---|
| 3,492,013 A | * | 1/1970 | Osbon | F16F 9/504 |
| | | | | 280/5.513 |
| 5,586,627 A | * | 12/1996 | Nezu | F16F 9/46 |
| | | | | 188/266.6 |
| 9,156,519 B2 | * | 10/2015 | Ripa | B62K 25/04 |

(Continued)

FOREIGN PATENT DOCUMENTS

| | | | | |
|---|---|---|---|---|
| DE | 102014207055 A1 | * | 9/2015 | B60G 17/033 |
| EP | 1505315 A2 | * | 2/2005 | F16F 9/062 |

(Continued)

OTHER PUBLICATIONS

International Search Report mailed Nov. 29, 2022 for the corresponding PCT International Patent Application No. PCT/JP2022/038282 (5 pages including English translation).

*Primary Examiner* — Nicole T Verley
(74) *Attorney, Agent, or Firm* — Leason Ellis LLP; Edward J. Ellis; Melvin C. Garner

(57) ABSTRACT

A shock absorber includes a first oil flow path and a second oil flow path connected to a damper case and allowing oil to pass therethrough, a compression resistance unit including a resistance unit oil chamber, which is connected to the first oil flow path and allows the oil to flow thereinto when a rod is displaced in a compression direction, and a receiving member having one end facing the resistance unit oil chamber and the other end receiving an urging force of a spring, a reservoir tank connected to the second oil flow path and allowing the oil to flow thereinto, and a flow rate control unit provided on the second oil flow path and capable of controlling a flow rate of the oil flowing into the reservoir tank.

9 Claims, 2 Drawing Sheets

(56)         References Cited

U.S. PATENT DOCUMENTS

| 10,288,143 | B2 * | 5/2019 | Sirven | ..................... | F16F 9/061 |
| 2005/0167940 | A1 | 8/2005 | Sirven | | |
| 2020/0361271 | A1 * | 11/2020 | Tong | ..................... | B60G 13/08 |
| 2023/0114717 | A1 * | 4/2023 | Boon | .................. | B60G 21/073 |
| | | | | | 701/37 |
| 2023/0356558 | A1 * | 11/2023 | Taylor | ................... | B60G 17/08 |

FOREIGN PATENT DOCUMENTS

| FR | 2838172 | B1 * | 7/2004 | | |
| JP | 61020411 | U | 2/1986 | | |
| JP | 2009101863 | A | 5/2009 | | |
| JP | 7482331 | B2 * | 5/2024 | ............. | B60G 17/08 |
| WO | WO-2015158675 | A1 * | 10/2015 | ............. | F16F 9/512 |

* cited by examiner

SHOCK ABSORBER

CROSS-REFERENCE TO RELATED PATENT APPLICATIONS

This application is a U.S. National Phase Application under 35 U.S. C. § 371 of International Patent Application No. PCT/JP2022/038282 filed on Oct. 13, 2022, the content of which is incorporated herein by reference in its entirety. The International Application was published in Japanese on Apr. 18, 2024 as International Publication No. WO/2024/079862 under PCT Article 21(2).

FIELD OF THE INVENTION

The present invention relates to a shock absorber used for, for example, a straddle-type vehicle, which can damp vibration energy or the like.

BACKGROUND OF THE INVENTION

A shock absorber called a rear cushion may be mounted on a rear portion of a vehicle body of, for example, a two-wheeled vehicle to damp vibration energy or the like input to the vehicle body from a road surface. JP2009-101863A discloses a technique related to a shock absorber such as a rear cushion.

A rear suspension as described in JP2009-101863A includes a spring that urges the rear suspension in an extending direction, a cylinder portion having an oil chamber filled with oil, a piston portion disposed inside the oil chamber of the cylinder portion, a sub-tank portion to which the oil from the oil chamber of the cylinder portion flows, and a spring moving mechanism that moves an end portion of the spring in a direction of increasing an urging force according to a moving speed of the piston portion.

The spring moving mechanism includes a movable portion that is disposed in an oil chamber thereof and slides in the oil chamber, and the movable portion includes an orifice for passing the oil flowing to the oil chamber.

When the piston portion moves in a compression direction at a speed exceeding a prescribed speed, the movable portion moves in a direction of compressing the spring due to flow resistance of the orifice. A compression amount of the spring is accordingly changed.

CITATION LIST

Patent Literature

Patent Literature 1: JP2009-101863A

Technical Problem

According to the rear suspension of JP2009-101863A, the oil in the cylinder portion flows to an oil chamber in the sub-tank portion through an oil passage formed in a side surface of the cylinder portion, the orifice, an oil chamber formed in an outer periphery of the spring moving mechanism, and an oil passage formed in the sub-tank portion.

The oil always passes through a peripheral edge of the spring moving mechanism when flowing from inside of the cylinder portion to inside of the sub-tank portion. For this reason, it is necessary to set a position and a size of the oil passage of the sub-tank portion in consideration of a movable range of the spring moving mechanism or the like, and a degree of freedom in design is reduced accordingly.

An object of the present invention is to provide a shock absorber having a high degree of freedom in design.

SUMMARY OF THE INVENTION

Solution to Problem

The present inventors obtained following findings as a result of intensive studies. Two oil flow paths including a first oil flow path and a second oil flow path that allow oil to pass therethrough are connected to a damper case accommodating a piston. The first oil flow path is connected to a compression resistance unit that acts on a spring to provide resistance when a moving speed of a rod is high, and the second oil flow path is connected to a reservoir tank allowing oil of a volume of the rod that has entered the damper case to flow thereinto. Further, a flow rate control unit that can control a flow rate of the oil flowing to the reservoir tank is provided on the second oil flow path.

By separately configuring the first oil flow path connected to the compression resistance unit and the second oil flow path connected to the reservoir tank, a high degree of freedom in design can be ensured. Then, when a flow rate of oil flowing out of the damper case increases due to a rapid displacement of the rod during a compression stroke, the flow rate of the oil to the reservoir tank is reduced by the flow rate control unit, and oil can flow toward the compression resistance unit. When the oil flows to the compression resistance unit, a receiving member receiving an urging force of the spring is less likely to be displaced, and the spring is less likely to be displaced. The present invention was completed based on these findings.

Hereinafter, the present disclosure will be described.

According to the present disclosure, there is provided a shock absorber including: a rod; a piston fixed to the rod; a damper case having a tubular shape and surrounding a part of the rod and the piston such that the rod and the piston are movable in an axial direction, in which oil is filled inside the damper case; a spring urging the rod and the damper case in an extension direction that is a direction in which the rod and the damper case are separated from each other; a first oil flow path connected to the damper case and allowing the oil to pass therethrough; a compression resistance unit including a resistance unit oil chamber and a receiving member, the resistance unit oil chamber being connected to the first oil flow path and allowing the oil to flow thereinto when the rod is displaced in a compression direction opposite to the extension direction, and the receiving member having one end facing the resistance unit oil chamber and an other end receiving an urging force of the spring; a second oil flow path separate from the first oil flow path and allowing the oil discharged from the damper case to pass therethrough; a reservoir tank connected to the second oil flow path and allowing the oil to flow thereinto; and a flow rate control unit provided on the second oil flow path and configured to control a flow rate of the oil flowing to the reservoir tank.

Advantageous Effects of Invention

According to the present invention, it is possible to provide the shock absorber having a high degree of freedom in design.

DETAILED DESCRIPTION OF THE INVENTION

Embodiments of the present invention will be described below with reference to the accompanying drawings. The embodiments shown in the accompanying drawings are examples of the present invention, and the present invention is not limited to the embodiments.

Example 1

Figure 1:
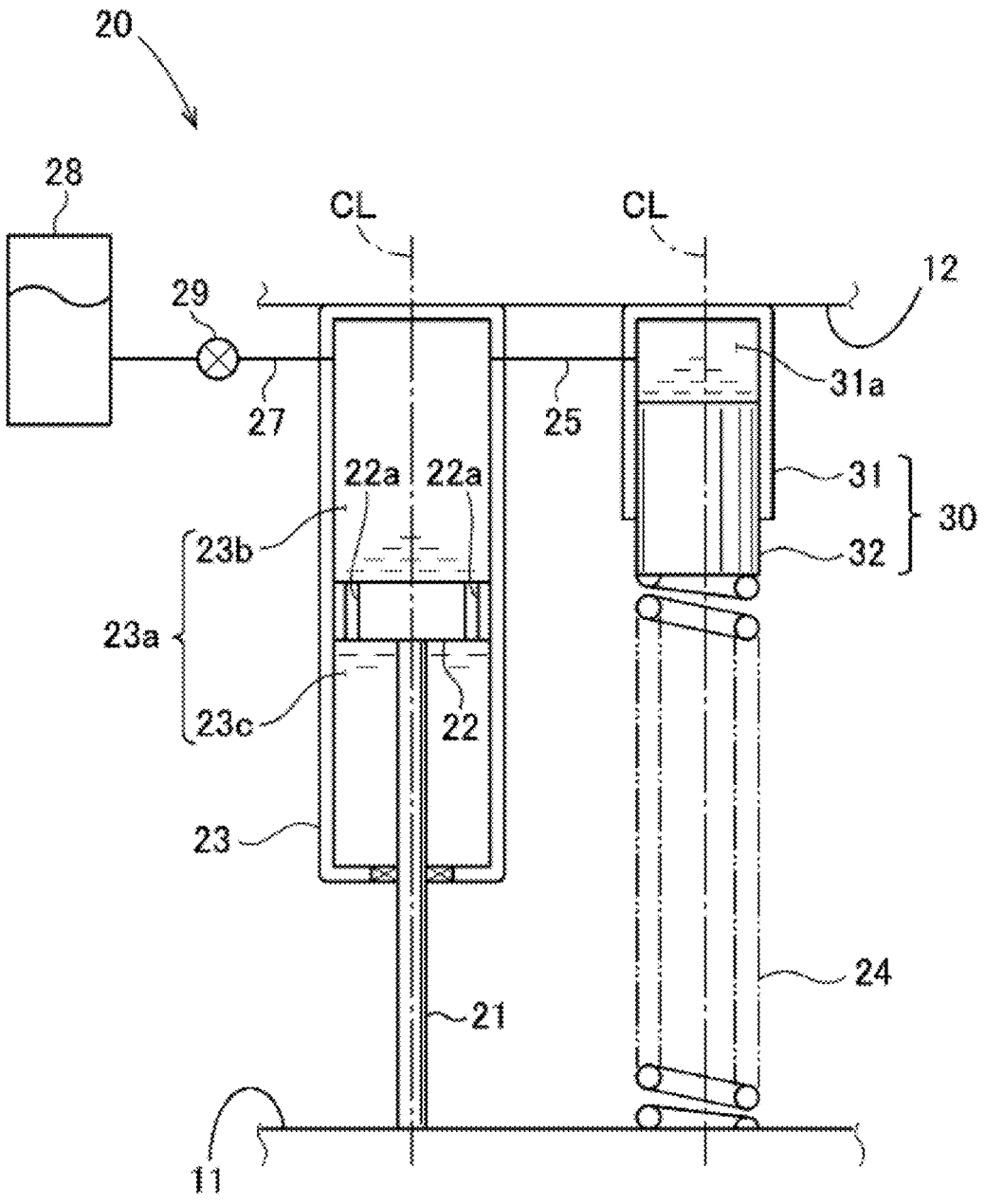
FIG. 1 is a schematic view of a shock absorber according to example 1.

Reference is made to FIG. 1. FIG. 1 schematically illustrates a shock absorber 20. The shock absorber 20 is, for example, a rear cushion provided at a rear portion of a two-wheeled vehicle and spanning a distance from a vehicle body to an axle of a rear wheel.

The shock absorber 20 has one end connected to one end portion 11 implemented by one of the vehicle body and the axle, and the other end connected to another end portion 12 implemented by the other one of the vehicle body and the axle.

The shock absorber 20 includes a rod 21 in a round bar shape connected to the one end portion 11, a piston 22 in a disk shape fixed to a top end of the rod 21, a damper case 23 in a tubular shape connected to the other end portion 12 and filled with oil therein, a spring 24 urging the rod 21 and the damper case 23 in a direction away from each other, a first oil flow path 25 connected to the damper case 23 and allowing the oil to pass therethrough, a compression resistance unit 30 connected to the first oil flow path 25 and receiving an urging force of the spring 24 by a top end, a second oil flow path 27 connected to the damper case 23 separately from the first oil flow path 25 and allowing oil to pass therethrough, a reservoir tank 28 connected to the second oil flow path 27 and allowing oil to flow thereinto, and a flow rate control unit 29 provided on the second oil flow path 27 and capable of controlling a flow rate (volume of oil flowing per unit time) of the oil flowing to the reservoir tank 28.

A part of the rod 21 is located outside the damper case 23, and a remainder is located inside the damper case 23. The rod 21 and the damper case 23 have substantially coinciding axes CL, and the rod 21 is movable along the axis CL.

When the two-wheeled vehicle receives vibration from a road surface during traveling, a distance between a wheel and the vehicle body changes. Accordingly, the rod 21 enters and exits the damper case 23. Hereinafter, a direction in which the rod 21 enters the damper case 23 may be referred to as a compression direction, and a direction in which the rod 21 exits the damper case 23 may be referred to as an extension direction.

The piston 22 has an outer diameter slightly smaller than an inner diameter of the damper case 23. The piston 22 is displaceable together with the rod 21 and is displaced along an inner wall surface of the damper case 23.

The piston 22 is formed with holes 22a each having a small diameter. When the piston 22 is displaced in the damper case 23, oil passes through the holes 22a. A damping force is generated when the oil passes through the holes.

It is also possible to provide a valve on an end surface of the piston 22, separately form the hole 22a through which oil passes only during displacement in the compression direction and the hole 22a through which oil passes only during displacement in the extension direction, and change the damping force generated during compression and extension.

Inside of the damper case 23 is a damper case oil chamber 23a filled with oil. The damper case oil chamber 23a includes a compression-side oil chamber 23b defined in the compression direction (upper side in the drawing) relative to the piston 22, and an extension-side oil chamber 23c defined in the extension direction (lower side in the drawing) relative to the piston 22. The displacement of the piston 22 changes a volume of the compression-side oil chamber 23b and a volume of the extension-side oil chamber 23c.

The first oil flow path 25 and the second oil flow path 27 are connected to the compression-side oil chamber 23b.

The spring 24 can adopt a compression coil spring. The spring 24 is disposed, for example, on an outer periphery of the damper case 23 on the same axis CL. The spring 24 urges the rod 21, the piston 22, and the damper case 23 in the extension direction.

The second oil flow path 27 is directly or indirectly connected to the damper case 23. Accordingly, oil discharged from the damper case 23 can pass through the second oil flow path 27. Similarly, the second oil flow path 27 is directly or indirectly connected to the reservoir tank 28.

The compression resistance unit 30 includes a case 31 to which the first oil flow path 25 is connected, and a receiving member 32 movable forward and backward in the case 31 and receiving an urging force of the spring 24. The case 31 and the receiving member 32 are, for example, formed in a cylindrical shape and surround the damper case 23.

Inside of the case 31 is a resistance unit oil chamber 31a filled with oil. The compression-side oil chamber 23b and the resistance unit oil chamber 31a are connected via the first oil flow path 25.

A bottom portion of the case 31 may be in contact with the spring 24 and the receiving member 32 may be in contact with the other end portion 12. In this case, the case 31 can be said to be a receiving member.

The reservoir tank 28 can adopt a well-known reservoir tank. For example, inside of the reservoir tank 28 is divided into a gas chamber and an oil chamber via a rubber bladder. The second oil flow path 27 is connected to the oil chamber of the reservoir tank 28.

The flow rate control unit 29 can adopt an orifice valve, a variable orifice valve, a needle valve, an electromagnetic valve, and the like. The flow rate control unit 29 can adopt another valve as long as a flow rate of oil flowing to the reservoir tank 28 can be controlled.

The flow rate control unit 29 may be manually operated by an operator, or may be electrically operated based on a displacement speed of the rod 21.

Operation of the shock absorber 20 will be described.

When the rod 21 is displaced in the compression direction, oil is discharged from the compression-side oil chamber 23b by a volume of the rod 21. A part of the discharged oil passes through the first oil flow path 25 and flows to the resistance unit oil chamber 31a. As hydraulic pressure in the resistance unit oil chamber 31a increases, the receiving member 32 is less likely to retract (less likely to be displaced toward the other end portion 12), and a force required to compress the spring 24 increases. Accordingly, displacement in the compression direction is restricted.

A remainder of the oil discharged from the compression-side oil chamber 23b when the rod 21 is displaced in the compression direction flows from the second oil flow path 27 to the reservoir tank 28 through the flow rate control unit 29.

For example, in a case where the flow rate control unit 29 is implemented by an orifice valve, a variable orifice valve, or a needle valve, the flow rate control unit 29 becomes resistance to the flow of the oil to the reservoir tank 28 when the flow rate of the oil discharged from the damper case 23 exceeds a prescribed flow rate. Accordingly, the flow rate of the oil is controlled.

When the flow rate control unit 29 adopts a variable orifice valve or a needle valve, the flow rate of the oil when the flow rate control unit 29 starts to function can be adjusted. The flow of the oil to the reservoir tank 28 can be blocked when the flow rate of the oil exceeds a prescribed flow rate.

When the flow rate control unit 29 adopts an electromagnetic valve, the flow rate control unit 29 blocks the flow of oil to the reservoir tank 28 when the flow rate of oil exceeds a prescribed flow rate.

As is clear from the above, the flow rate control unit 29 can control the flow rate of the oil flowing to the reservoir tank 28 when the flow rate of the oil discharged from the damper case 23 exceeds a prescribed flow rate.

When the flow rate control unit 29 is electrically operated, a prescribed flow rate of oil when the flow rate control unit 29 operates can be adjusted by information from a vehicle speed sensor, an acceleration sensor, and the like, in addition to the flow rate.

When the flow rate control unit 29 is manually operated, for example, an occupant can switch between an on-road mode and an off-road mode. In the off-road mode, a prescribed flow rate of the oil when the flow rate control unit 29 operates can be set to be smaller than that in the on-load model. Accordingly, in the off-road mode, the flow rate control unit 29 can be operated more easily than in the on-load mode.

When the flow rate control unit 29 controls the flow of the oil to the reservoir tank, more oil discharged from the damper case 23 flows from the first oil flow path 25 to the resistance unit oil chamber 31*a*. That is, when the rod 21 is displaced at a high speed and the flow rate of the oil discharged from the damper case 23 increases, the oil is easier to flow to the resistance unit oil chamber 31*a*. By making it easier for the oil to flow to the resistance unit oil chamber 31*a*, displacement in the compression direction can be restricted more quickly. Even when a wheel climbs over a large step and a load in the compression direction is rapidly applied to the shock absorber 20, the spring 24 can be prevented from being compressed to a limit.

Example 2

Next, example 2 will be described with reference to the drawings.

Figure 2:
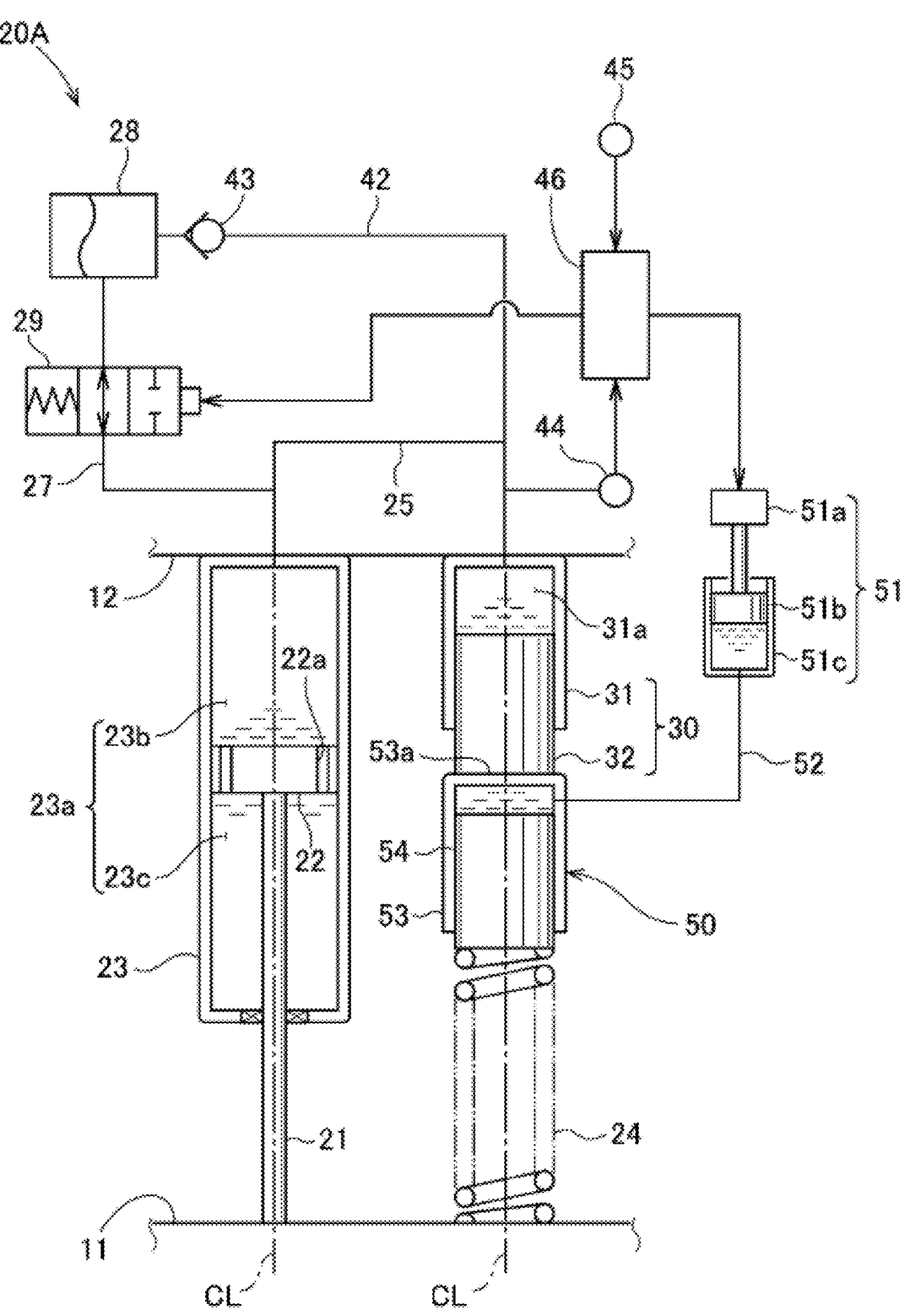
FIG. 2 is a schematic view of a shock absorber according to example 2.

Reference is made to FIG. 2. FIG. 2 schematically illustrates a shock absorber 20A according to example 2. Components common to those of the shock absorber 20 (see FIG. 1) according to example 1 are denoted by the same reference numerals, and detailed description thereof will be omitted.

The shock absorber 20A includes a vehicle height adjustment mechanism 50 provided between the compression resistance unit 30 and the spring 24 to adjust a vehicle height, a third oil flow path 42 connecting the reservoir tank 28 to the first oil flow path 25 and allowing oil to pass, a backflow prevention valve 43 provided on the third oil flow path 42, allowing oil to flow from the reservoir tank 28 to the first oil flow path 25, and blocking the flow of oil from the first oil flow path 25 to the reservoir tank 28, a flow rate sensor 44 provided on the first oil flow path 25 and capable of detecting a flow rate of oil, another sensor 45 capable of detecting other information on a vehicle, and a control unit 46 that controls the flow rate control unit 29 and the vehicle height adjustment mechanism 50 based on information from the flow rate sensor 44 and the other sensor 45.

The vehicle height adjustment mechanism 50 includes a pump 51 controlled by the control unit 46 and capable of feeding oil, a vehicle height adjustment oil flow path 52 connected to the pump 51 at one end and allowing oil to pass therethrough, a vehicle height adjustment case 53 connected to the other end of the vehicle height adjustment oil flow path 52 and filled with oil, and a vehicle height adjustment receiving member 54 movable forward and backward in the vehicle height adjustment case 53 and receiving an urging force of the spring 24.

The vehicle height adjustment case 53 and the vehicle height adjustment receiving member 54 are formed, for example, in a cylindrical shape and surround the damper case 23. The vehicle height adjustment case 53 has a bottom portion 53*a* in contact with a top end of the receiving member 32, and the vehicle height adjustment receiving member 54 has a top end in contact with the spring 24. It can be said that the spring 24, the vehicle height adjustment mechanism 50, and the compression resistance unit 30 are disposed in series on the axis CL. It can be said that the receiving member 32 of the compression resistance unit 30 receives the urging force of the spring 24 via the vehicle height adjustment mechanism 50.

The compression resistance unit 30 may be in contact with the spring 24, and the vehicle height adjustment mechanism 50 may be in contact with the compression resistance unit 30.

The pump 51 includes a motor 51*a* that operates when being energized based on an electric signal from the control unit 46, a pump piston 51*b* connected to the motor 51*a* and displaceable along a motor shaft, and a pump case 51*c* accommodating the pump piston 51*b* and filled with oil therein.

The motor 51*a* can adopt a well-known stepping motor. A freely selected motor can be adopted, even a motor other than the stepping motor.

In a case of increasing the vehicle height, the motor 51*a* operates based on an electric signal from the control unit 46, and the pump piston 51*b* moves forward in the pump case 51*c*. When the pump piston 51*b* moves forward, oil in the pump case 51*c* is fed to the vehicle height adjustment case 53 via the vehicle height adjustment oil flow path 52. As hydraulic pressure in the vehicle height adjustment case 53 increases, the vehicle height adjustment receiving member 54 moves forward to increase the vehicle height.

In a case of decreasing the vehicle height, the motor 51*a* operates based on an electric signal from the control unit 46, and the pump piston 51*b* moves backward in the pump case 51*c*. Accordingly, the hydraulic pressure in the pump case 51*c* decreases. When the hydraulic pressure in the pump case 51*c* decreases, the vehicle height adjustment receiving member 54 retracts by the urging force of the spring 24, and the vehicle height decreases. When the vehicle height adjustment receiving member 54 retracts, oil in the vehicle height adjustment case 53 is fed to the pump case 51*c* through the vehicle height adjustment oil flow path 52. When to increase or decrease the vehicle height will be described later.

The backflow prevention valve 43 can adopt, for example, a well-known check valve. The backflow prevention valve 43 may use a valve other than the check valve as long as the backflow prevention valve 43 allows passage of oil only in one direction from the reservoir tank 28 to the second oil flow path 27.

The flow rate sensor 44 can adopt a known sensor that can detect a flow rate of oil. Instead of the flow rate sensor 44, a stroke amount sensor that can detect a stroke amount of the rod 21 can be used. A reason will be described later.

The other sensor 45 can adopt, for example, one or more of a vehicle speed sensor that detects a vehicle speed, an acceleration sensor that detects an acceleration of the vehicle, a side stand sensor that detects whether a side stand is lowered or raised, a flow rate control unit information sensor that detects operation information on the flow rate control unit 29, a vehicle height adjustment information sensor that detects operation information on the vehicle height adjustment mechanism 50, a stroke amount sensor that detects a stroke amount of the rod 21, and a timer that can detect time.

When the other sensor 45 adopts a stroke amount sensor and a timer, the stroke amount of the rod 21 per unit time can be detected. That is, a displacement speed of the rod 21 can be detected. A flow rate of oil discharged from the damper case 23 is proportional to the stroke amount of the rod 21 per unit time, and thus the flow rate control unit 29 can be controlled based on information from a stroke amount sensor and a timer instead of the flow rate sensor 44.

Alternatively, the other sensor 45 may adopt an acceleration sensor. For example, a vehicle body sinks significantly when a brake is suddenly applied. The rod 21 is displaced in a compression direction, and thus the flow rate of the oil flowing out from the damper case 23 increases. For this reason, the flow rate control unit 29 may be controlled based on information from an acceleration sensor.

As the other sensor 45, any sensor for acquiring vehicle information necessary for controlling the flow rate control unit 29 and/or the vehicle height adjustment mechanism 50 can be used other than the above-described sensors.

The control unit 46 controls the flow rate control unit 29 and the vehicle height adjustment mechanism 50 based on vehicle information from the flow rate sensor 44 and the other sensor 45.

The control unit 46 controls the flow rate of oil that can pass through the flow rate control unit 29 based on, for example, information from the flow rate sensor 44, or based on information on a moving speed of the rod 21 and operation information on the flow rate control unit 29 sent from the other sensor 45 when the flow rate of the oil discharged from the damper case 23 exceeds a prescribed flow rate.

The control unit 46 controls the vehicle height adjustment mechanism 50 to adjust the vehicle height based on, for example, vehicle speed information, acceleration information, position information on a side stand, and operation information on the vehicle height adjustment mechanism 50 from the other sensor 45.

The shock absorbers 20 and 20A described above are summarized below.

FIGS. 1 and 2 will be referred to. First, the shock absorber 20, 20A includes the rod 21, the piston 22 fixed to the rod 21, the tubular damper case 23 filled with oil therein and surrounding a part of the rod 21 and the piston 22 such that the rod 21 and the piston 22 are movable in an axial direction, the spring 24 urging the rod 21 and the damper case 23 in an extension direction that is a direction in which the rod 21 and the damper case 23 are separated from each other, the first oil flow path 25 connected to the damper case 23 and allowing the oil to pass therethrough, the compression resistance unit 30 including the resistance unit oil chamber 31a, which is connected to the first oil flow path 25 and allows the oil to flow thereinto when the rod 21 is displaced in a compression direction opposite to the extension direction, and the receiving member 32 having one end facing the resistance unit oil chamber 31a and the other end receiving an urging force of the spring 24, the second oil flow path 27 separate from the first oil flow path 25 and allowing the oil discharged from the damper case 23 to pass therethrough, the reservoir tank 28 connected to the second oil flow path 27 and allowing the oil to flow thereinto, and the flow rate control unit 29 provided on the second oil flow path 27 and capable of controlling a flow rate of the oil flowing to the reservoir tank 28.

Two oil flow paths including the first oil flow path 25 and the second oil flow path 27 allowing oil to pass therethrough are connected to the damper case 23 accommodating the piston 22. The first oil flow path 25 is connected to the compression resistance unit 30 that acts on the spring 24 to provide resistance when a moving speed of the rod 21 is high, and the second oil flow path 27 is connected to the reservoir tank 28 allowing oil of a volume of the rod 21 that has entered the damper case 23 to flow thereinto. The flow rate control unit 29 capable of controlling a flow rate of the oil flowing to the reservoir tank 28 is provided on the second oil flow path 27.

By separately configuring the first oil flow path 25 connected to the compression resistance unit 30 and the second oil flow path 27 connected to the reservoir tank 28, a high degree of freedom in design can be ensured. When a flow rate of oil flowing out of the damper case 23 increases due to a rapid displacement of the rod 21 during a compression stroke, the flow rate control unit 29 can reduce the flow rate of the oil to the reservoir tank 28 and cause the oil to flow toward the compression resistance unit 30. When the oil flows to the compression resistance unit 30, the receiving member 32 receiving the urging force of the spring 24 is less likely to be displaced, and the spring 24 is less likely to be displaced. That is, it is possible to provide the shock absorbers 20 and 20A with a high degree of freedom in design while restricting the rapid displacement of the rod 21 in the compression direction.

At this time, the flow rate control unit 29 is preferably provided on the second oil flow path 27. As the control by the flow rate control unit 29, a method of providing the flow rate control unit 29 on the first oil flow path 25 and directly allowing an increase in the flow rate of the oil to the compression resistance unit 30 when the flow rate of the oil discharged from the damper case 23 increases is also conceivable. However, in this case, the flow rate of the oil to the reservoir tank 28 may also increase depending on the flow rate of the oil discharged from the damper case 23. When the flow rate of the oil to the compression resistance unit 30 is increased by providing the flow rate control unit 29 on the second oil flow path 27 and reducing the flow rate of the oil to the reservoir tank 28, the flow rate of the oil to the compression resistance unit 30 can be more reliably and quickly increased. Further, the control for decreasing the flow rate of the oil can be performed with a simpler configuration than the control for increasing the flow rate of the oil. Accordingly, the flow rate control unit 29 is preferably provided on the second oil flow path 27.

Second, in the shock absorber 20, 20A described in the first aspect, the flow rate control unit 29 is implemented by an orifice valve or a variable orifice valve. By configuring the flow rate control unit 29 with an inexpensive valve, the shock absorbers 20 and 20A can also be provided at low cost.

Third, in the shock absorber 20, 20A according to the first or the second aspect, a flow rate of oil by the flow rate control unit 29 can be changed manually by an operator or electrically. When a mode is changed by a manual operation, the operator can preferably adjust ride comfort by his/her selection. Electrical operation is preferable since it is possible to appropriately control the compression resistance unit 30 based on vehicle information and prevent the spring 24 from being compressed to a limit.

Reference is made only to FIG. 2. Fourth, the shock absorber 20A according to any one of the first to third aspects further includes the vehicle height adjustment mechanism 50 that can adjust a vehicle height. While the vehicle height can be adjusted, the spring 24 can be prevented from being compressed to a limit by the compression resistance unit 30 when the oil discharged from the damper case 23 exceeds a prescribed flow rate.

Fifth, in the shock absorber 20A according to the fourth aspect, the compression resistance unit 30 and the vehicle height adjustment mechanism 50 are disposed in series. By such an arrangement in series, the shock absorber 20 can be made compact in the axial direction.

Sixth, in the shock absorber 20A according to the fifth aspect, the vehicle height adjustment mechanism 50 is disposed between the spring 24 and the compression resistance unit 30. Accordingly, the shock absorber 20A can be expected to be further reduced in size. When the vehicle height adjustment mechanism 50 is brought into direct contact with the spring 24, the vehicle height can be adjusted more accurately.

Seventh, in the shock absorber 20A according to any one of the fourth to sixth aspects, the vehicle height adjustment mechanism 50 includes a pump 51 that can feed a fluid for adjusting the vehicle height. The vehicle height is adjusted by feeding the fluid by the pump 51. The vehicle height can be adjusted quickly and accurately.

Eighth, the shock absorber 20A according to the seventh aspect includes the control unit 46 that controls the flow rate control unit 29 and the pump 51. By controlling the flow rate control unit 29 and the pump 51 by the control unit 46, the compression resistance unit 30 and the vehicle height adjustment mechanism 50 can be appropriately controlled.

Ninth, in the shock absorber 20A according to the eighth aspect, the flow rate control unit 29 and the pump 51 can be independently controlled. Since the compression resistance unit 30 and the vehicle height adjustment mechanism 50 can be independently controlled, it is possible to perform correction in consideration of an influence of each of the compression resistance unit 30 and the vehicle height adjustment mechanism 50.

Although the shock absorber according to the present invention has been described using a rear cushion of a two-wheeled vehicle as an example, the shock absorber is also applicable to a front fork. The shock absorber is not limited to being mounted on a straddle-type vehicle such as a two-wheeled vehicle, and may be mounted on another vehicle, or may be mounted on a device other than a vehicle.

Further, although the present invention has been described with reference to a single damper case type shock absorber including one damper case as an example, the present invention is also applicable to a double damper case type shock absorber including two damper cases.

The present invention is not limited to the examples as long as operations and effects of the present invention are exhibited.

INDUSTRIAL APPLICABILITY

The shock absorber of the present invention is suitable for a rear cushion of a two-wheeled vehicle.

REFERENCE SIGNS LIST

20, 20A shock absorber
21 rod
22 piston
23 damper case
24 spring
25 first oil flow path
27 second oil flow path
28 reservoir tank
29 flow rate control unit
30 compression resistance unit
31a resistance unit oil chamber
32 receiving member
46 control unit
50 vehicle height adjustment mechanism
51 pump

What is claimed is:

1. A shock absorber comprising:

a rod;

a piston fixed to the rod;

a damper case having a tubular shape and surrounding a part of the rod and the piston such that the rod and the piston are movable in an axial direction, in which oil is filled inside the damper case;

a spring urging the rod and the damper case in an extension direction that is a direction in which the rod and the damper case are separated from each other;

a first oil flow path connected to the damper case and allowing the oil to pass therethrough;

a compression resistance unit including a resistance unit oil chamber and a receiving member, the resistance unit oil chamber being connected to the first oil flow path and allowing the oil to flow thereinto when the rod is displaced in a compression direction opposite to the extension direction, and the receiving member having one end facing the resistance unit oil chamber and an other end receiving an urging force of the spring;

a second oil flow path separate from the first oil flow path and allowing the oil discharged from the damper case to pass therethrough;

a reservoir tank connected to the second oil flow path and allowing the oil to flow thereinto; and a flow rate control unit provided on the second oil flow path and configured to control a flow rate of the oil flowing to the reservoir tank.

2. The shock absorber according to claim 1, wherein the flow rate control unit is implemented by an orifice valve or a variable orifice valve.

3. The shock absorber according to claim 1, wherein the flow rate of the oil controlled by the flow rate control unit is available to be changed manually by an operator or electrically.

4. The shock absorber according to claim 1, further comprising:

a vehicle height adjustment mechanism configured to adjust a vehicle height.

5. The shock absorber according to claim 4,
wherein the compression resistance unit and the vehicle
height adjustment mechanism are disposed in series.

6. The shock absorber according to claim 5,
wherein the vehicle height adjustment mechanism is
disposed between the spring and the compression resis-
tance unit.

7. The shock absorber according to claim 4,
wherein the vehicle height adjustment mechanism
includes a pump configured to feed a fluid for adjusting
the vehicle height.

8. The shock absorber according to claim 7, comprising:
a control unit configured to control the flow rate control
unit and the pump.

9. The shock absorber according to claim 8,
wherein the flow rate control unit and the pump are
independently controllable.

* * * * *